United States Patent Office 3,146,071
Patented Aug. 25, 1964

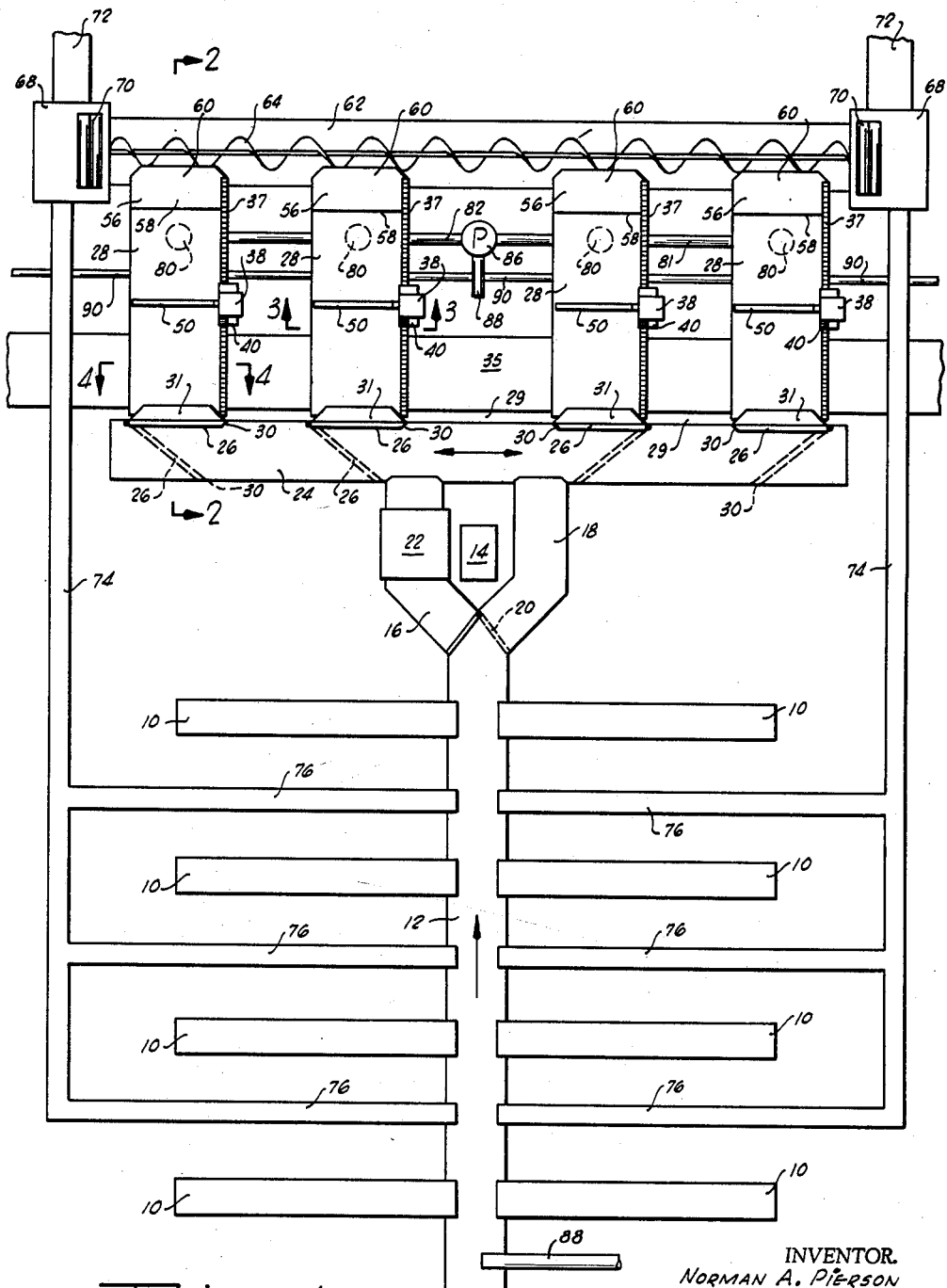

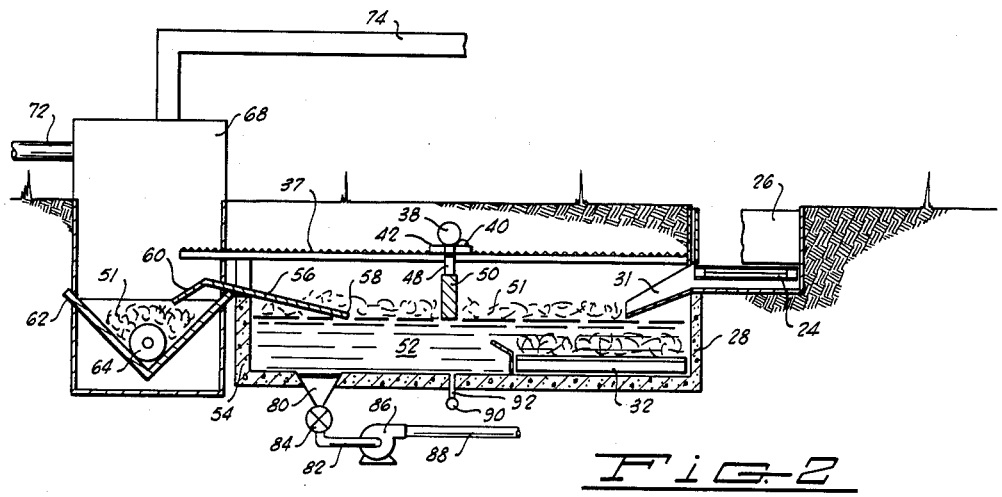
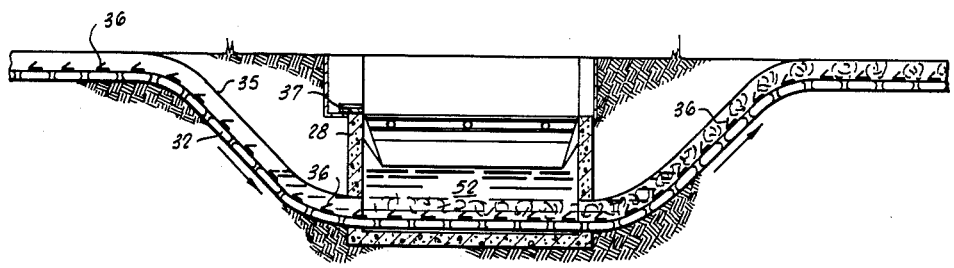
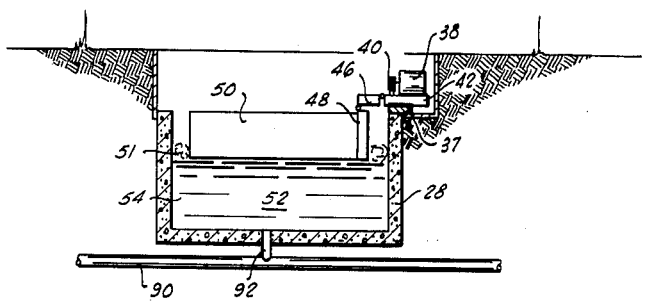

3,146,071
REFUSE RECLAMATION SYSTEM
Norman A. Pierson, Norman, Okla., assignor to Naturizer, Incorporated, Norman, Okla., a corporation of Oklahoma
Filed Dec. 18, 1961, Ser. No. 160,220
17 Claims. (Cl. 23—259.1)

This invention relates to a process for economically disposing of all types of refuse and waste material from municipalities. More particularly, but not by way of limitation, the invention relates to a process for disposing of a variety of types of municipal and industrial wastes such as tree limbs, canaloupes, cannery wastes, and agricutural wastes of all types.

The problem of disposing of the tremendous quantities of waste which are produced in large industrial cities is one which has not yet been solved in an economical manner. In other words, such wastes continue to constitute a liability of considerable magnitude which must be sustained by industrial municipalities. In some instances, cannery waste and many other types of refuse must be transported considerable distances to an incineration plant, or to a burial site, or in many instances to a deep water, ocean dumping zone in order to accomplish final sanitary disposal. In the course of such transport, the materials are contacted by flies and numerous other disease-carrying vermin which constitute a health hazard to the populace of the municipality.

With the exception of a process of composting municipal refuse by bacterial action which has recently been developed, no system has yet been devised which will effectively convert any considerable portion of such municipal and industrial waste material to useful and economically valuable products in a relatively short period of time. The bacterial composting procedure, however, is not suited to the acceptance of all types of industrial wastes such as acids or other corrosive chemicals and the like, and likewise can receive certain hard inorganic materials such as glass, concrete and bones only to a limited extent.

The present invention provides a process for classifying, and to a limited extent, treating all types of municipal and industrial wastes in a sanitary and efficient manner so that a large proportion of such wastes may be subsequently converted to useful products by bacterial composting, fermentation, and other chemical, bacteriological or mechanical processing procedures. The system is versatile in that it can be utilized to separate the waste materials into their several components, and then utilize these components in a number of ways as may be most desirable under different circumstances.

In its broadest aspect, the present invention comprises a main conveyor and a series of cross-conveyors extending normal to the main conveyor on each side thereof and feeding into the main conveyor. Each of these cross-conveyors is located underground and is closed at the top by a sliding cover which prevents access by flies and other vermin to the materials dumped upon the cross-conveyors. Each of the cross-conveyors and its associated receiving bin will normally be used for a particular type of waste material, such as cannery waste, tree limbs, sewage sludge or other materials produced by an industrial complex or a municipality. One of the cross-conveyors and its associated receiving bin may be reserved for the recepit of a heterogeneous mixture of materials in situations where it is impossible to undertake separation of the several individual types of wastes which may be collected and brought to the system. Another of the cross-conveyors preferably carries an additive such as lime, or aqueous ammonia or the like for controlling certain chemical properties and processes which subsequently occur in the waste material. Each of the several cross-conveyors is individually controlled from a main control panel located at a central control station. Thus, the different types of waste material which are placed upon the several cross-conveyors may be fed onto the main conveyor selectively and as desired.

At the discharge end of the main conveyor, a suitable pulverizing or grinding device is positioned to receive the materials from the main conveyor in order that they may be ground, or partially ground, to a fine state. In some instances, however, the character of the material which is fed onto the main conveyor from the cross-conveyors will be such that grinding or comminution is either unnecessary or undesirable. A bypass conveyor leading around the grinding apparatus is therefore provided to receive materials from the main conveyor when such a situation obtains.

After being ground, or after bypassing the grinding apparatus, as the case may be, the conglomerate waste materials are fed onto another long conveyor which extends transversely across the end of the main conveyor. A plurality of pivoted gates are provided along one side of this cross-conveyor for selectively diverting the waste materials carried thereby into a series of underground treating tanks which are generally of sufficient size to receive an amount of refuse equal to one day's supply to the last-mentioned cross-conveyor.

The underground treating tanks which receive material discharged from the cross-conveyor are utilized for separation by flotation and initial chemical digestion or fermentation. Each of the treating tanks is filled with water or any other desired liquid. The ground conglomerate waste material is fed from the cross-conveyor into one end of a particular tank, whereupon the denser materials such as metals, stone, concrete and the like will settle to the bottom of the tank. Lighter materials such as most of the insoluble organic materials will float upon the surface of the water in the tank. Soluble organic and inorganic materials will, of course, be dissolved in the liquid of the tank. If desired, a different type of liquid material than water may be used, such as alcohol, petroleum fractions and the like.

The denser materials which settle to the bottom of the treating tanks are constantly removed therefrom by a conveyor located at the bottom of the tanks. Provision is made for bubbling air or other gas through the liquid in the treating tank to retain the mass of material therein in an aerobic condition and to promote the growth of aerobic bacteria and spores in the mass. In general, the waste materials which float upon the liquid in the tank, and which are dissolved in the liquid, are allowed to stand in the tank for a period of from approximately 24 to 48 hours. During this time, a certain amount of fermentation and conversion of materials as a result of chemical and bacterial activity occurs. The optimum time for retention of the mass in the treating tank will depend upon the end materials which are desired and also upon the additives which are incorporated in the materials. During this period of time, the agitation of the tank by bubbling of a suitable gas therethrough is continued.

Following the agitation period of 24 to 48 hours, the contents of the treating tank are allowed to stand quiescently for at least one hour. The materials then stratify with the insoluble organic materials floating at the top of the mass, and a rather clear liquor being formed as the lower layer thereof. In most instances, the presence of at least two immiscible liquids will result in the formation of two distinct liquid layers. The various layers of the mass are then separated by suitable procedures. The solid organic insoluble materials are skimmed from the top of the mass and are passed through a series of squeeze rolls to remove excess liquid therefrom. The expressed liquid is combined with the liquor separated from the mass as the bottom layers thereof, and the squeezed organic materials are passed into a bacterial composting plant or may be passed into a fermentation tank where the organic material may be converted to a mash suitable for use as an animal feed. Apparatus is also provided for recycling a portion of the organic material to the main conveyor so that the waste materials moving into the system may be inoculated with beneficial bacteria and fungi which have had a chance to multiply in the settling tanks.

The liquor which has stratified at the bottom of the conglomerate mass in the treating tanks is separated from the mass by a separatory drain system or other appropriate means and is passed to distillation or selective adsorption equipment for separation into its several chemical components. The liquor will, of course, contain the mother liquid which was initially placed in the several treating tanks and will additionally contain all of the soluble materials, both organic and inorganic, of the waste materials which are fed into the tanks. It will also contain a small amount of suspended or emulsified material which may be separated from the liquor by centrifugation, evaporation or other well known techniques. The liquor ordinarily contains valuable components such as soluble acids, alcohols, sugars and other materials which, when isolated, constitute valuable products. Some of the relatively pure materials which are derived from the liquor may desirably be recirculated to the treating tanks in order to promote fermentation and such chemical conversion or reconstitution as may be desired. For example, certain beneficial enzymes isolated from the liquor may be recirculated for this purpose. A portion of the alcohols which are separated from the liquor may also be recycled to the waste material carried by the main conveyor in order to destroy pathogens and other deleterious organisms which may be present in such material.

From the foregoing description, it will be apparent that a major object of the present invention is to provide a process and system for receiving and separating a variety of municipal and industrial waste materials in a sanitary manner.

A further object of the present invention is to provide a system for processing a heterogeneous conglomerate mixture of municipal and industrial waste materials for the purpose of obtaining a physical and chemical separation of the several components thereof into certain categories of materials which may more easily be processed to useful products.

A further object of the present invention is to provide a waste disposal system which enables a considerable improvement in the economics of disposal of municipal and industrial waste to be realized.

An additional object of the present invention is to provide a system for preliminary processing a variety of types of municipal and industrial wastes prior to their conversion to useful products or to waste materials which are in a form permitting them to be more easily and inexpensively disposed of.

Additional objects and advantages will become apparent from a further reading of the following disclosure in conjunction with a perusal of the accompanying drawings which illustrate my invention.

In the drawings:

FIGURE 1 is a partially schematic plan view of the system of the present invention.

FIGURE 2 is a view in section taken along line 2—2 of FIGURE 1.

FIGURE 3 is a view in section taken along line 3—3 of FIGURE 1.

FIGURE 4 is a view in section taken along line 4—4 of FIGURE 1.

Referring now to the drawings in detail, and particularly to FIGURE 1, reference character 10 designates a plurality of cross-conveyors which are utilized for the reception of various types of refuse or waste materials which are collected throughout a municipality or industrial complex. Each one of the cross-conveyors 10 is disposed in a subterranean bin which opens at the surface of the ground. The bins are covered by a sliding panel (which is not seen) which may be opened when it is desired to dump the waste materials from collection trucks on the conveyor at the bottom of the bin and may be closed at other times to prevent access of flies and other vermin to the waste materials on the conveyor at the bottom of the bin. Each one of the cross-conveyors 10 feeds into a main conveyor 12 which extends at right angles to each of the cross-conveyors 10 and is positioned at a slightly lower level than the cross-conveyors so that waste materials gravitate from the end of each of the cross-conveyors 10 onto the main conveyor 12. Like the cross-conveyors 10, the main conveyor 12 is also located below the surface of the earth and is provided with a cover (not shown) to prevent access of flies and vermin to the waste materials thereon.

As previously indicated, each of the cross-conveyors 10 is provided for the reception of a different type of waste material so that one of the cross-conveyors may be utilized for receiving wet garbage and table scraps, another for receiving sewage sludge and the like, another for receiving cannery waste of a particular type, another for receiving tree limbs, scrap metal, etc. One of the cross-conveyors 10 may be reserved for the storage and introduction of a treating material such as lime or other type of chemical which may be beneficially added to the waste material on the main conveyor 12. Each of the cross-conveyors 10 and the main conveyor 12 are actuated and controlled in their rates of movements from a central control station 14 which is elevated above the ground so that an operator may view the dumping procedures which will result in the filling of one or more of the cross-conveyors 10. In providing such selective control of the cross-conveyors 10 and main conveyor 12, any desired combination of refuse or waste materials on the main conveyor may be effected.

As the main conveyor 12 moves in the direction indicated by the arrow thereon, the waste material is moved toward the control station 14. At the end of the main conveyor 12 adjacent the central control station 14, the main conveyor divides into two branches 16 and 18. The diversion of the mixed waste materials from the main conveyor 12 into either of the branches 16 or 18 as desired is facilitated by a pivoted door 20 which may be pivoted between the dotted line and solid line positions shown in FIGURE 1. The control of the pivoted door 20 is automatically accomplished from the central control station 14. In the branch 16 of the main conveyor 12 a pulverizing device 22 is located for the purpose of grinding the waste materials to a fine, pulverized state. In some instances, however, the character of the material which is fed onto the main conveyor 12 will be such that grinding or comminution is either unnecessary or undesirable. In such cases, the door 20 is pivoted to the position shown in FIGURE 1, and the waste material from the main conveyor 12 is diverted into the branch conveyor 18. This permits the material from the main conveyor 12 to be bypassed around the pulverizing device 22.

After leaving the pulverizing device 22, or alternately, after being bypassed around the pulverizing device 22 on the branch conveyor 18, the waste material is deposited upon a long cross-conveyor 24 which extends parallel to each of the receiving cross-conveyors 10 and normal to the branch conveyors 16 and 18. The long cross-conveyor 24 is constructed so that the conveyor may be driven in either direction as indicated by the double-headed arrow thereon. Like the main conveyor 12 and cross-conveyors 10, the long cross-conveyor 24 is disposed below the surface of the earth and is covered with a sliding or hinged cover plate for sanitary purposes.

At spaced intervals along the length of the long cross-conveyor 24, a plurality of pivoted or hinged diverting doors 26 are provided for the purpose of diverting the waste material from the long cross-conveyor into any one of several underground tanks or storage chambers 28. The hinged diverting doors 26 are beveled at their ends opposite the end which is hinged to the side 29 of the bin in which the conveyor 24 is located. This is for the purpose of permitting the waste material carried by the long conveyor 24 to pass easily by the hinged diverting doors 26 when they are pivoted into parallel abutting relation to the side 31 of the bin containing the conveyor. These positions of the hinged diverting doors 26 are shown in solid lines in FIGURE 1. The beveled end 30 of the doors 26 also permits these doors to fit flush against the opposite side of the bin containing the conveyor 24 when they are pivoted to their diverting positions as shown in dashed lines in FIGURE 1. Like the door 20 provided for controlling the flow of waste material from the main conveyor 12 onto the branch conveyors 16 and 18, each of the hinged diverting doors 26 is controlled from the central control station 14 so that the diversion of refuse from the long cross-conveyor 24 into one of the treating tanks 28 may be facilitated as desired.

The construction and relative arrangements of the long cross-conveyor 24, the hinged diverting doors 26 and the treating tanks 28 may best be understood by referring to FIGURE 2 in conjunction with FIGURE 1. A chute 31 is provided in association with each of the diverting doors 26 for permitting the waste materials from the long cross-conveyor 24 to slide downwardly into the respective treating tanks 28. As will be noted in referring to FIGURE 2, each of the tanks 28 is located a sufficient distance below the surface of the earth to permit the waste materials to gravitate thereto from the conveyor 24.

Each of the treating tanks 28 is constructed of concrete or other suitable impervious material and is rectangular in shape as indicated in FIGURES 1 and 2. At the end of each treating tank 28 adjacent the long cross-conveyor 24, a transverse conveyor 32 is provided in the bottom of the tank and functions to remove rocks, metals, bones, glass and other solid heavy materials which gravitate to the bottom of the treating tank when the waste materials are placed therein. The construction of the transverse conveyor 32 may best be understood by referring to FIGURE 4. The conveyor 32 is contained in a conduit 35 which communicates through a suitable seal with the interior of each of the tanks 28. The conveyor 32 carries a plurality of projections 36 which are inclined in the direction of movement of the conveyor (illustrated by the arrows in FIGURE 4) and which function to move the solid materials referred to above out of the tanks 28 and along the conveyor. Along one side of each of the treating tanks 28 and at the top edge thereof, a track 37 is provided and supports a motor 38. A pinion 40 is drivingly connected to the motor 28 and engages the teeth of the track 37. Energization of the motor 38 thus causes the motor to move along the track 37 from one end of the treating tank 28 to the other. Suitable electrical switches (not shown) for automatically breaking the circuit to the motor 38 when it reaches either end of the track 37 are provided.

Referring next to FIGURE 3, a carriage 42 which supports the motor 38 is connected to a rod 46 which extends out over the treating tank 28 in a direction normal to the track 37. The arm 46 is hingedly connected to the carriage 42 of the motor 38 so that it may be pivoted upwardly from a position parallel with respect to the track 37. A suitable spring (not seen) is provided, however, to resist such upward pivotation and retain the arm 46 in its horizontal position when no substantial force acts thereupon to pivot it upwardly. A second arm 48 is hingedly connected to the outer end of the arm 46 and depends downwardly therefrom toward the bottom of treating tank 28. The arm 48 is also spring biased to retain it in its perpendicular relation to the arm 46. Rigidly attached to the lower end of the vertical arm 48 is a paddle member 50 which is of sufficient width, and is positioned, to extend across the surface of the waste material in the treating tank 28 and down into the waste material a sufficient distance to reach the interface which is normally formed between floating solid materials 51 and the underlying liquid strata or liquor 52.

At the end 54 of the tanks 28 opposite the conveyor 32, an inclined slideway 56 extends through the end wall of the treating tank 28 and is inclined downwardly into the waste materials contained in the tank. The inner end 58 of the inclined slideway 56 is positioned at a level sufficiently low in the treating tank 28 to permit the paddle member 50 to contact the upper surface of the slideway 56 as the paddle member moves toward the end 54 of the treating tank 28. Stated differently, the inner end 58 of the inclined slideway 56 is positioned at a lower level than the normal interface between the floating solid materials 51 and the liquor 52 of the waste materials in the treating tank 28.

At its end 60 opposite the inner end 58 of the inclined slideway 56, the slideway is bent downwardly and is tapered from the transveres dimension of the tank 28 to a smaller transverse dimension as shown in FIG. 1. The downwardly inclined end 60 ofthe slideway 56 terminates over a generally V-shaped trough 62 which extends transversely across the ends of each of the treating tanks 28 and is positioned to receive material from the inclined slideways 56 of each treating tank. A helical or auger conveyor 64 is positioned in the bottom of the V-shaped trough 62 and is employed to move waste material along the trough 62 toward a liquor expression station 68 located at each end of the V-shaped trough 62. At each liquor expression station 68, one or more pairs of cooperating rollers 70 are provided for squeezing the solid waste material directed to the liquor expression stations by the auger conveyor 64 in order to remove a substantial portion of the liquid therefrom. The expressed liquid or liquor is then added to the liquid which is separated from the mixture in the treating tanks 28 in the manner hereinafter described.

From each of the liquor expresion stations 68, suitable piping and conduits 72 are provided for conveying the squeezed solid materials to a bacterial composting plant or a fermentation tank where useful products such as compost or animal feed may be manufactured. Suitable conduits and conveying systems 74 are also provided for recycling a portion of the squeezed solid material or the liquor expressed therefrom to the main conveyor 12 so that the waste material upon the main conveyor 12 may be preinoculated with beneficial bacteria and spores or other beneficial agents if this is desired. A number of branch conduits or conveyors 76 are provided and lead into the main conveyor 12 at various points along the length thereof in order to facilitate the addition of materials from the expression stations 68 at any point along the main conveyor 12 as shall be desired.

Between the conveyor 32 and the end 54 of each of the treating tanks 28, a large bottom drain 80 is providede in the bottom of each of the treating tanks. Each of the drains 80 is conected to a gathering line 82 which leads through a valve 84 to a pump 86. The pump 86 is in turn connected to a conduit system 88 which may be used to direct liquid pumped from each of the treating tanks 28 to apparatus for further processing said liquids by distillation, extraction, centrifugation or other suitable apparatus for processing the liquids as may be desired to isolate or produce various useful products. The conduit system 88 is also constructed to permit a portion of the liquid from the tanks 28 to be recirculated to the main conveyor 12 for addition to the waste material thereon in order to effect a preinoculation or prewetting thereof, if this is desirable.

It is frequently desirable to agitate the waste materials contained in the treating tanks 28 by bubbling or passing a gas therethrough during the time the waste material is retained in the tanks. For this purpose a gas line 90 extends beneath the tanks 28 and is placed in communication with the interior of the tanks by means of the branch lines 92 as shown in FIGURES 1, 2 and 3.

Operation

To summarize now the operation of the system and process for receiving and separating municipal and industrial waste materials, the waste materials are initially collected in collection trucks and moved to the locale of the invention. According to the type of waste material which is carried by the several trucks, the trucks dump the waste or refuse into one of the cross-conveyors 10. The provision of a plurality of cross-conveyors 10 permits the waste materials to be classified according to their particular nature, and, as has been previously indicated, some of the conveyors will be used primarily for receiving and conveying fluid or semi-fluid materials, while others of the conveyors will be utilized for conveying tree limbs, cardboard, scrap metal and other such waste materials.

The material contained in each of the covered cross-conveyors 10 is moved in toward the main conveyor 12 in accordance with control signals originating at a central control station 14. The operator of the control station 14 is constantly apprised of the status of loading, and the nature of the materials within the bins containing each of the cross-conveyors 10, and based upon such knowledge, the operator may control the type of materials which are placed upon the main conveyor 12. The activation of each of the cross-conveyors 10 will depend in each case upon the nature of the end-products which are desired, and upon the particular status of the separation system at any time. Thus, it may be desirable in some instances to feed only wet garbage or table scraps into the main conveyor 12 in order that this material may ultimately be converted to a beneficial compost by bacterial action. On the other hand, in some instances the economic circumstances may dictate that only materials such as scrap metals, paper, glass, etc., be channeled into the main conveyor 12 and passed through the separation and reclamation system.

The materials which are moved by the main conveyor 12 approach the central control station 14, and the operator at the control station may then divert the stream of waste materials on the waste conveyor 12 into either of the branch conveyors, 16 or 18. This is accomplished by the manipulation of the pivoted door 20. If the nature of the waste materials moving on the main conveyor 12 is such that comminution or grinding of the materials is required, the operator can direct the materials onto the branch conveyor 16 and into the pulverizing device 22. On the other hand, further reduction in particle size of the waste materials on the main conveyor 12 may be unnecessary or undesirable, in which case, the materials will be diverted onto the branch conveyor 18.

From the branch conveyors 16 and 18, the waste materials are fed onto the long cross-conveyor 24. As has previously been explained, this conveyor may be operated in either direction. The direction of operation will depend upon which of the underground treating tanks 28 is to be utilized. All except one of the pivoted or hinged diverting doors 26 are normally retained in parallel, abutting relation to one side 29 of the bin in which the conveyor 24 is located. One of the doors is opened out to extend across the conveyor 24 to intercept and divert the waste materials on this conveyor into a particular one of the underground treating tanks 28.

As the waste materials are deposited in one of the treating tanks 28, the denser materials such as metals, glass, bones, rocks and the like gravitate to the bottom of the treating tank and come to rest upon the transverse conveyor 32. Normally, the underground treating tanks 28 will initially contain a substantial amount of a preselected liquid such as water, alcohol, petroleum fractions or the like. The selection of the treating tank liquid will depend upon the type of separation which is desired, and the chemical activity which it is sought to initiate in the treating tanks. The denser solid materials which gravitate to the bottom of the treating tanks 28 and come to rest upon the conveyor 32 are moved out of the treating tanks 28 upon the conveyor 32 in the manner illustrated in FIGURE 4. These materials are carried to a subsequent processing station where they may be subjected to a magnetic separation process for removing the magnetic metals from the mass of materials on the conveyor 32, or to other separation and processing techniques.

The remainder of the waste materials which are deposited in the treating tanks 28 from the chute 31 fill the treating tank and either go into solution in the liquid therein or are buoyed up and float upon the surface of the liquid. In general, all of the organic and inorganic materials which are soluble in the liquid contained within the treating tanks 28 will go into solution and will become a part of the liquid phase designated by reference character 52 in the drawings and hereinafter referred to as the liquor strata contained in the treating tanks. The insoluble materials of relatively low density will float to the surface of the liquid in the treating tanks. This material is that which is designated by reference character 51 in the drawings.

Each of the underground treating tanks 28 is designed to accommodate approximately the amount of refuse which is received by the system during one day's collection by the refuse collection trucks. After one of the treating tanks 28 has been filled with refuse material from the cross-conveyor 24, the material may be allowed to stand quiescently therein for a period of from 24 to 48 hours, or, in the case of some types of processing, it may be desirable to bubble a suitable gaseous material through the waste material in the tanks 28 during its residence therein. For example, the passage of air through the waste material in the treating tanks assists in the acceleration of the decomposition of the material therein by the action of aerobic bacteria. In other instances, the introduction of certain types of gaseous materials may assist substantially in the promotion of fermentation in the body of waste material. In any event, the residence time of 24 to 48 hours within the treating tanks 28 is intended to permit a certain amount of chemical and bacterial conversion of the waste materials to be effected. The optimum time for retention of the mass of waste material in any of the tanks 28 will depend upon the end products which are desired, and also upon the additives which have been incorporated in the materials. If agitation by the bubbling of the gas through the mass of waste material has been carried out during the 24 to 48 hour period, the material is then generally permitted to stand quiescently for a period of at least one hour following such agitation. This is to permit a sharper division to occur between the liquid and solid phases of the materials within the mass. Frequently, the liquor or lower liquid phase of the mass will actually separate upon standing into at least two immiscible layers as a result of the organic and inorganic natures of the materials which are dissolved in the liquid. The development of two liquid phases inevitably occurs in situations where alcohol is the liquid which is initially placed in the treating tanks 28.

Following the stratification of the materials in one of the treating tanks 28 by virtue of the one hour quiescent standing period, the appropriate motor 38 is energized to move the paddle member 50 from the end of the treating tank 28 adjacent to the conveyor 24 to the opposite end of the treating tank. As the paddle moves along through the waste materials in the treating tank 28, the floating solids 51 are pushed before the paddle toward the inclined slide 56 located at the end 54 of the tank. Upon reaching the inner end 58 of the slide 56, the paddle member 50 moves up the slide 56 pushing the solid materials 51 before it. The pivotal connections of the arms 46 and 48 which support the paddle member 50 permit it to be moved in a vertical plane while maintaining its horizontal status. As the solid materials reach the outer end 60 of the inclined slide 56, they gravitate downwardly into the V-shaped trough 62.

After the solid materials have been deposited in the V-shaped trough 62, they are moved toward one of the ends thereof by the auger conveyor 64. This conveyor is reversible so that the solid materials 51 may be moved toward either end of the V-shaped trough 62. The solid materials 51 leaving the V-shaped trough 62 are passed into one of the liquid expression stations 68 where the material passes through pairs of cooperating rollers 70 and is thus squeezed to a relatively dry state. The liquid which is expressed or squeezed from the solid materials 51 is combined with the liquid which is removed from the bottom of the treating tanks 28 in a manner later to be described, or may be, in part, recycled to the main conveyor 12 by suitable conduits so that the waste or refuse material moving upon the main conveyor 12 may be preconditioned prior to being introduced to one of the treating tanks 28. The solid material which has been passed through the rollers 70 is then conveyed by suitable conduits or conveyors 72 to a bacterial composting plant or into a fermentation tank where the material may be converted to a beneficial compost material or to a suitable animal feed. Other suitable types of final processing for conversion of the solid materials 51 to useful products may also be utilized if desired.

As is well known in the art, it is frequently desirable to preinoculate or precondition the waste materials which are to be separated and subsequently converted to useful products by adding certain materials, such as organic materials which are highly enriched with beneficial bacteria and fungi, to the waste materials. This may be accomplished in the case of the present invention by recycling a portion of the solid material from the liquid expression station 68 back to the main conveyor 12 by means of the conduits or conveyors 74 and 76.

The liquor which has stratified in the bottom of the treating tanks 28 is removed therefrom by way of the drains or sumps 80 and the gathering conduit 82. It will be apparent that in the case of those situations in which two or more liquid phases are formed in the bottom of the treating tanks 28, the lowermost phase will be removed from the tank prior to the removal of those lying above this phase. The liquids which are received from the treating tanks 28 by the gathering conduit 82 are pumped by the pump 86 through the conduit system 88 to suitable apparatus for further processing the liquids to useful products. Such apparatus may be a distillation tower, an extraction system, a centrifuge or other suitable means for isolating various useful products from the liquids, or for achieving certain types of chemical conversions. In addition, the conduit system 88 is constructed in a manner to permit a portion of the liquids from the tanks 28 to be recirculated to the main conveyor 12 for addition to the waste materials thereon as may be desired.

From the foregoing description, it will be apparent that the present invention provides a novel and useful system and process for receiving and separating a variety of municipal and industrial waste materials in a sanitary manner. The materials are kept in covered, vermin-proof bins during the entire separation procedure and maximum sanitation is thus attained. The division and separation of the materials is achieved in a manner which permits them to be easily and selectively directed to certain subsequent processing operations whereby the materials may be converted by physical and chemical processes to many types of useful products.

Although a particular embodiment of the system used in practicing the method of the invention has been described in considerable detail hereinbefore, it will be noted that a number of changes in these details may be effected without departure from the basic principles underlying the invention. Insofar as such changes and innovations are included in refuse processing systems which continue to employ these basic principles, such systems are considered to be encompassed by the spirit and scope of the invention except as the same may be necessarily limited by the appended claims.

I claim:

1. A system for processing heterogeneous wastes and refuse materials comprising:
    a plurality of subterranean cross-conveyors for receiving various types of refuse from refuse collection trucks;
    a subterranean main conveyor for receiving refuse from said cross-conveyors;
    a subterranean distributing conveyor for receiving refuse from said main conveyor;
    a plurality of subterranean refuse treating tanks adjacent said distributing conveyor;
    means cooperating with said distributing conveyor for selectively filling said treating tanks with refuse from said distributing conveyor, and
    separating means for separating the refuse in said treating tanks into various portions having certain related properties.

2. A system as claimed in claim 1 and further characterized to include comminuting means interposed between said main conveyor and said distributing conveyor for receiving refuse from said main conveyor and reducing the particle size of said refuse prior to its deposition on said distributing conveyor.

3. A system for processing heterogeneous wastes and refuse materials comprising:
    a plurality of subterranean cross-conveyors for receiving various types of refuse from refuse collection trucks;
    a subterranean main conveyor for receiving refuse from said cross-conveyors;
    a pair of branch conveyors branching from said main conveyor;
    means for diverting refuse from said main conveyor onto one of said branch conveyors;
    comminuting means associated with one of said branch conveyors for reducing the particle size of the refuse on said one branch conveyor;
    a subterranean distributing conveyor for receiving refuse from said branch conveyors;
    a plurality of subterranean refuse treating tanks adjacent said distributing conveyor;
    means cooperating with said distributing conveyor for selectively filling said treating tanks with refuse from said distributing conveyor; and
    separating means for separating the refuse in said treating tanks into various portions having certain related properties.

4. A system as claimed in claim 3 and further characterized to include vermin-proof covers over each of said conveyors and said treating tanks for facilitating the sanitary processing of said refuse.

5. A system as claimed in claim 3 and further characterized to include a central control station for controlling the operation of each of said conveyors, said diverting means, said comminuting means, said selective filling means and said separating means from a central vantage point.

6. A system as claimed in claim 3 and further characterized to include means for recycling a part of said separated portions to said main conveyor.

7. A system as claimed in claim 3 wherein said diverting means comprises a pivoted door positioned to be pivoted to a position such that either of said branch conveyors is blocked off from said main conveyor.

8. A system as claimed in claim 3 wherein said means cooperating with said distributing conveyor for selectively filling said treating tanks comprises a plurality of hinged diverting doors spaced along the length of said conveyor and each pivotable between a position parallel to said conveyor along one longitudinal edge thereof, and a position across said conveyor.

9. A system as claimed in claim 3 wherein said separating means comprises:
 solids-removing conveyor means extending transversely through said treating tanks at the bottom thereof for removing dense solid materials which gravitate to the bottom of said tanks;
 means for skimming light, floating materials from the top of the body of refuse in said tanks;
 liquid expression means for squeezing entrained liquids from said light floating materials; and
 drains in the bottoms of said tanks for removing liquid phases therefrom in the order of the density of said phases.

10. A system as claimed in claim 3 and further characterized to include a liquid in each of said tanks for treating the refuse in said tanks to accomplish a desired physical or chemical change in said refuse.

11. A system as claimed in claim 3 and further characterized to include means associated with each of said treating tanks for passing a gas from the bottom to the top of the refuse in said tanks.

12. A system as claimed in claim 9 wherein said means for skimming light, floating materials from the top of the body of refuse in said tanks comprises:
 a track along one side of said tank;
 a motor mounted on said track for movement therealong;
 a pinion driven by said motor and cooperating with said track for moving said motor toward either end of said tank;
 a paddle member connected to said motor and extending across said tank in a direction normal to said track, said paddle member being dimensioned to extend from the surface of said waste material to the interface between said light floating materials and the materials lying thereunder;
 and an inclined slide extending into the refuse in said tank and positioned on said tank and with respect to said refuse to receive said light floating materials as they are moved toward one end of said tank by said paddle member.

13. A system as claimed in claim 12 and further characterized to include means for conveying said light floating materials from said inclined slides to said liquid expression means.

14. A system as claimed in claim 9 wherein said liquid expression means comprises at least one set of cooperating rollers for receiving said light floating materials and squeezing entrained liquids therefrom.

15. A system as claimed in claim 9 and further characterized to include a gathering line for collecting the liquid passing through said drains from said treating tanks;
 valve means associated with each of said drains for preventing the passage of liquids through said drains into said gathering line;
 a pump in said gathering line for drawing liquids from said tanks into said gathering lines;
 and a conduit system connected to said pump for recycling a portion of said liquids to said main conveyor and to a subsequent processing operation.

16. A system as claimed in claim 9 wherein said solids-removing conveyor means comprises:
 a conduit sealingly connected to each of said tanks at the bottom thereof and extending normal to said tanks adjacent said distributing conveyor, said conduit being curved in a vertical plane so that the portions of said conduit between said tanks rises to a level higher than the liquid materials in said tanks;
 and a conveyor in said conduit having projections extending upwardly therefrom and inclined in the direction of movement of said conveyor for removing solids from the bottom of said tanks.

17. A system for processing heterogeneous wastes and refuse materials comprising:
 a plurality of cross-conveyors for receiving various types of refuse from refuse collection trucks;
 a subterranean main conveyor for receiving refuse from said cross-conveyors;
 a subterranean distributing conveyor for receiving refuse from said main conveyor;
 at least one subterranean refuse treating tank adjacent said distributing conveyor;
 means for directing refuse from said distributing conveyor into said subterranean refuse treating tanks; and
 separating means for separating the refuse in said treating tanks into various portions having certain related properties.

References Cited in the file of this patent
UNITED STATES PATENTS

| 1,260,103 | Wallace et al. | Mar. 19, 1918 |
| 1,392,211 | Peck | Sept. 27, 1921 |
| 2,655,434 | Laurenty | Oct. 13, 1953 |
| 2,734,803 | Ruskin | Feb. 14, 1956 |
| 2,929,688 | Riker et al. | Mar. 22, 1960 |